United States Patent [19]

Itoh

[11] Patent Number: 4,501,384
[45] Date of Patent: Feb. 26, 1985

[54] DEVICE FOR MOUNTING CONTAINER BOX ON MOTORCYCLE

[75] Inventor: Masaki Itoh, Akashi, Japan

[73] Assignee: Kawasaki Jukogyo Kabushiki Kaisha, Kobe, Japan

[21] Appl. No.: 478,872

[22] Filed: Mar. 25, 1983

[30] Foreign Application Priority Data

Mar. 26, 1982 [JP] Japan ............................ 57-43946[U]

[51] Int. Cl.³ .............................................. B62J 7/04
[52] U.S. Cl. ................................ 224/32 A; 224/32 R; 224/39
[58] Field of Search ............... 224/39, 30 R, 32 R, 224/32 A, 281

[56] References Cited

U.S. PATENT DOCUMENTS

| | | | |
|---|---|---|---|
| 1,460,760 | 7/1923 | McGee | 224/32 R X |
| 3,625,405 | 12/1971 | Kezar et al. | 224/32 A |
| 3,921,868 | 11/1975 | Reichbach | 224/32 A |
| 4,260,085 | 4/1981 | Jefferson | 224/32 R |
| 4,266,703 | 5/1981 | Litz | 224/32 A |

Primary Examiner—Steven M. Pollard
Attorney, Agent, or Firm—Leydig, Voit, Osann Mayer and Holt, Ltd.

[57] ABSTRACT

A device for mounting a container box on the upper rear side of a large-size motorcycle. The container box is slidably mounted so that position of the container box can be adjusted in the back and forth direction by the fellow passenger without using any special tool. The fellow passenger is relieved from fatigue in long-distance touring because he can change the position of his body by the adjustment of the position of the container box which serve as a back rest.

5 Claims, 10 Drawing Figures

1

DEVICE FOR MOUNTING CONTAINER BOX ON MOTORCYCLE

BACKGROUND OF THE INVENTION

The present invention broadly relates to a motorcycle carrying a container box on the rear part above the rear wheel thereof and, more particularly, to an improvement in the device for mounting the container box on the rear part of the motorcycle.

Recently, motorcycles, particularly large-size motorcycles, are often used for continuous long-distance touring in tandem riding condition. In general, the long-distance touring require the riders to carry various things such as clothes, beverages, spare parts of the machine, maps and so forth. In order to contain such things, some of the motorcycles are equipped with container boxes or saddle bags at both sides of the rear wheel and a container box or trunk above the rear wheel. The container box located above the rear wheel and disposed at the rear side of the seat is fixedly secured to the chassis to limit the position or posture of the fellow passenger on the rear seat. Therefore, the riders, particularly the fellow passenger tend to get tired during long continuous riding. In order to relieve the riders from the fatigue, it is desirable that the position of the rear container box is adjusted and changed at a suitable interval to permit the fellow passenger to vary the riding position. It will be very effective in relieving the fellow passenger from fatigue if he can freely adjust the position of the rear container box while he is on the motorcycle.

Hitherto, however, the rear container box is fixedly secured as shown, for example, in Japanese Patent Laid-Open No. 144640/1979 or Japanese Utility Model Laid-Open No. 101678/1980 so that the fellow passenger cannot adjust the riding position EASY.

SUMMARY OF THE INVENTION

Accordingly, an object of the invention is to provide a device for mounting a container box on the rear part of a motorcycle, improved to permit the rider to adjust the position of the container box in back and forth direction without using any special tool, thereby to relieve the fellow passenger from fatigue.

To this end, according to the invention, there is provided, in a motorcycle having a container box mounted on a part of the motorcycle body above the rear wheel or on a stay which is fixed to the body, a device for mounting the container box comprising: a means for permitting the container box to slide in back and forth direction along the part of the body or along the stay; and a locking means for releasably fixing the container box selectively at one of at least two predetermined positions along the path of sliding movement of the container box.

The above and further objects and novel features of the invention will more fully appear from the following detailed description when the same is read in conjunction with the accompanying drawing. It is to be expressly understood, however, that the drawing is for purpose of illustration only and is not intended as a definition of the limits of the invention.

DESCRIPTION OF THE PREFERRED EMBODIMENTS

Preferred embodiments of the invention will be described hereinunder with reference to the accompanying drawings.

Figure 1:
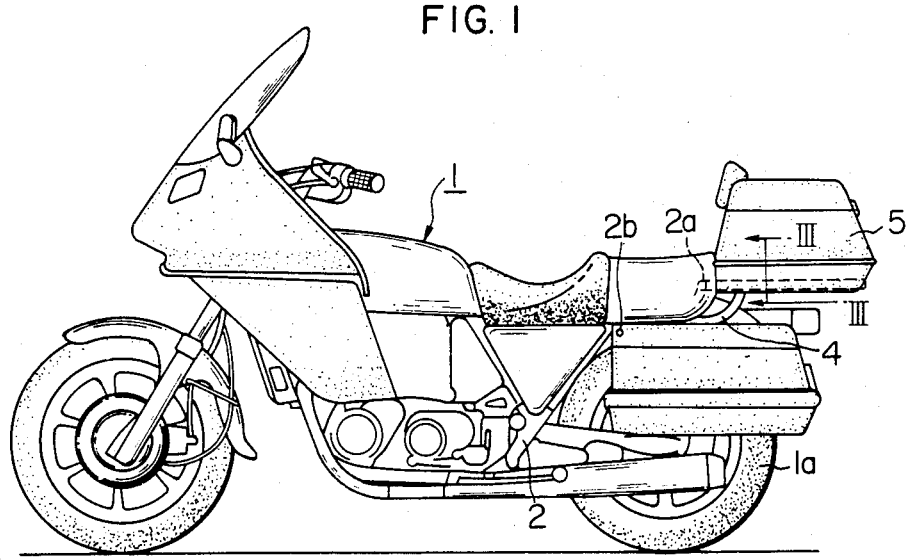
FIG. 1 is a side elevational view of a motorcycle incorporating a container box mounting device in accordance with the invention.
Figure 2:
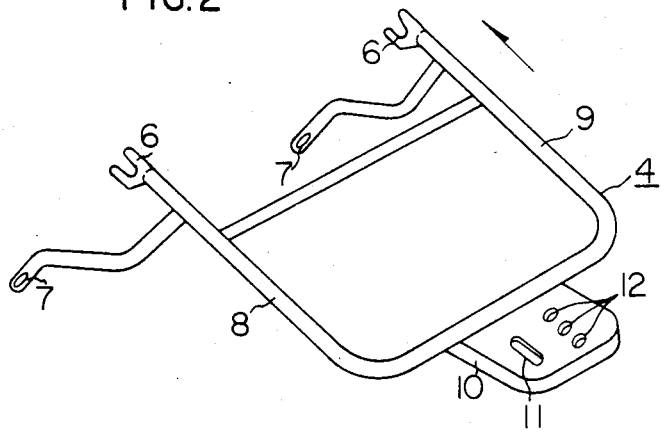
FIG. 2 is a side perspective view of a stay.

Referring first to FIG. 1, a motorcycle has a body generally designated by reference numeral 1 and constituted by a frame 2. A container box supporting means or mounting stay 4 is secured to the rear end 2a of the frame 2 and also to the upper retainers 2b of rear shock absorbers (not shown) so as to extend rearwardly from the frame 2. A container box 5 made of, for example, plastic is secured at its lower end to the upper side of the stay 4 for free movement in the back and forth direction. Referring to FIG. 2, the stay 4 is constituted mainly by metallic pipes, tubing or the like and is provided at its front end with fixing portions 6,6 and 7,7 at which the stay 4 is secured to the rear end 2a of the frame 2 and the upper retainers 2b of the rear shock absorbers. The stay 4 is further provided with supports or rail portions 8 and 9 for sliding engagement with the container box 5 (see FIG. 1) and a tab portion or locking member 10 extending rearwardly from a pipe portion which interconnects the rear ends of the rail portions 8 and 9. The tab portion 10 is provided with an elongated slot 11 extending in the longitudinal direction of the motorcycle and a plurality of holes 12 arranged in a row parallel to the elongated slot 11, as will be most clearly seen from FIG. 2.

Figure 3:
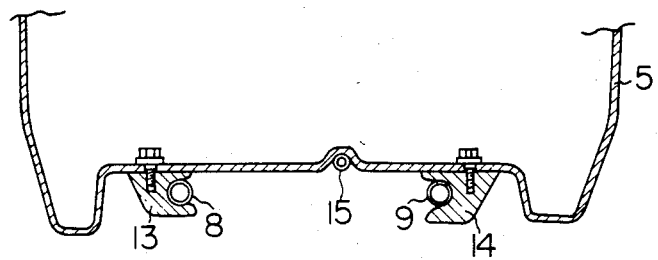
FIG. 3 is a sectional view taken along the line III—III of FIG. 1.

As shown in FIG. 3, guide members 13 and 14 are fastened to the lower side of the container box 5 by means of, for example, bolts. These guide members 13 and 14 slidably fit respective rail portions 8 and 9 of the stay 4. The mounting device is further provided with a position adjusting cable 15 which will be explained later.

Figure 4:
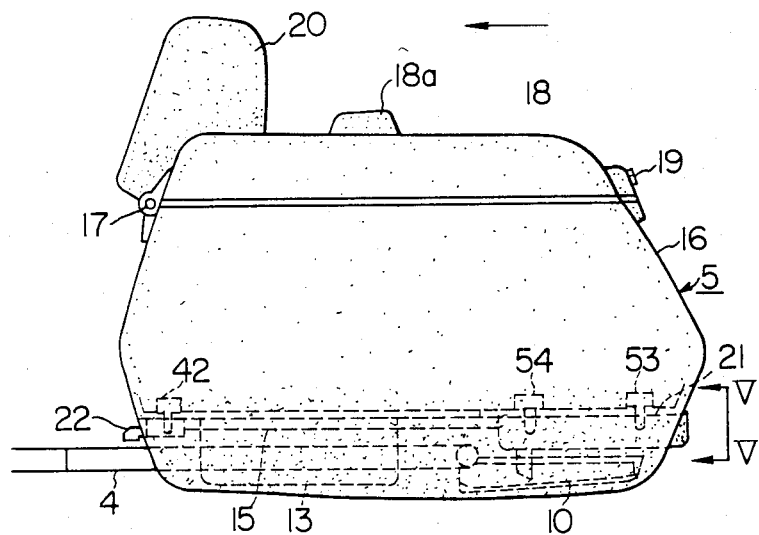
FIG. 4 is an enlarged side elevational view of a portion of the motorcycle around the container box.

As shown in FIG. 4, a lock 21 with key cylinder, for cooperating with the tab portion 10 of the stay 4, is secured to the lower part of the rear end of the container box 5, by means of bolts 53 and 54. A position adjusting lever 22 will be explained later.

Figure 5:
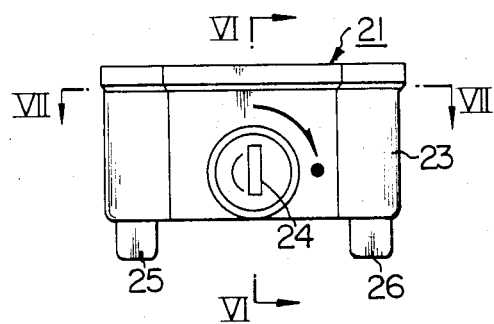
FIG. 5 is an end view of a portion of the container box mounting device as viewed in the direction of arrows V—V.

Referring now to FIG. 5, the lock 21 has a body 23 which is provided substantially at the center thereof with a key hole 24. A first lock or locking bar 25 and a second lock or locking bar 26 project downwardly from left and right side portions of the body 23. The first lock bar 25 is adapted to be received by the elongated slot 11 in the tab portion 10 (see FIG. 2), while the second lock bar 26 is adapted to engage one of the holes 12 of the row parallel to the slot 11.

Figure 6:
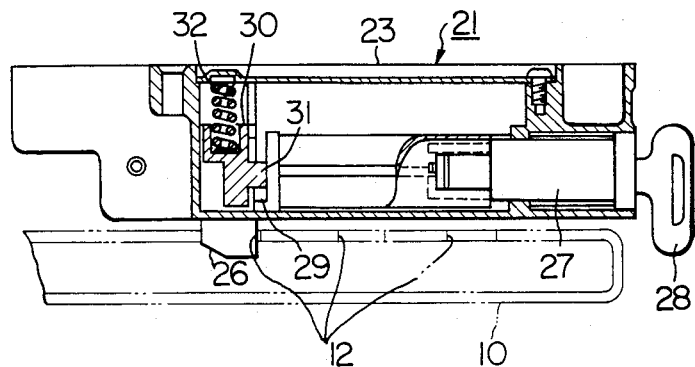
FIG. 6 is a sectional view taken along the line VI—VI of FIG. 5.

As will be seen from FIG. 6, as a key 28 is inserted into the key cylinder 27 and rotated, the rod 29 rotates as a unit with the key cylinder 27 into contact with a projection 31 on the connecting member 30 thereby to push the same upwardly overcoming the resilient force of the spring 32. As a result, the lock bars 25 and 26 are withdrawn simultaneously out of the slot 11 and the hole 12 of the tab 10.

Figure 7:
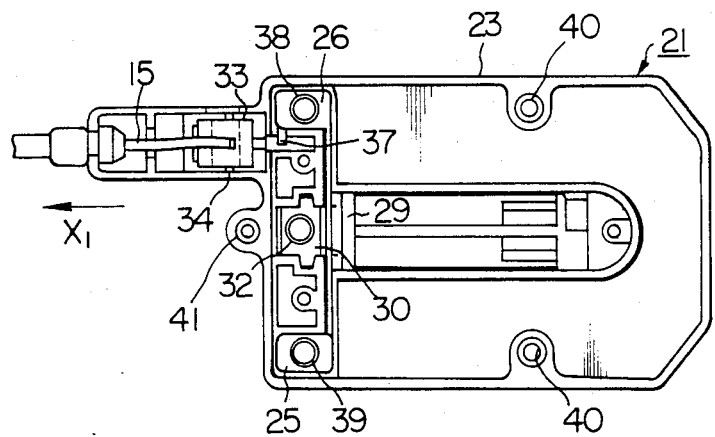
FIG. 7 is a plan view as viewed in the direction of arrows VII—VII of FIG. 5.
Figure 8:
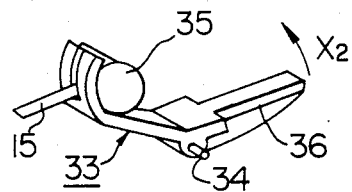
FIG. 8 is a perspective view of a portion of the container box mounting device near a holder.

Referring now to FIG. 7, a bowden cable 15 is connected through a cable holder 33 to the second lock bar 26. The arrangement is such that the second lock bar 26 solely is raised as the cable 15 is pulled in the direction of the arrow $X_1$. As will be seen from FIG. 8, the holder 33 is rockable around a pin 34 and holds at its one end an end piece 35 attached to the end of the cable 15 while the other end constituting a claw 36 abuts the lower side of the projection 37 on the second lock bar 26. The pin 34 is press-fitted in the body 23. As the cable 15 is pulled in the direction of the arrow $X_1$, the holder 33 rocks in the direction of arrow $X_2$ (see FIG. 8) so that the claw 36 pushes only the second lock bar 26 overcoming the resilient force of the spring 38. In FIG. 7, numerals 40 and 41 denote threaded holes for bolts 53,54 by means of which the lock 21 is secured to the container box 5.

Figure 9:
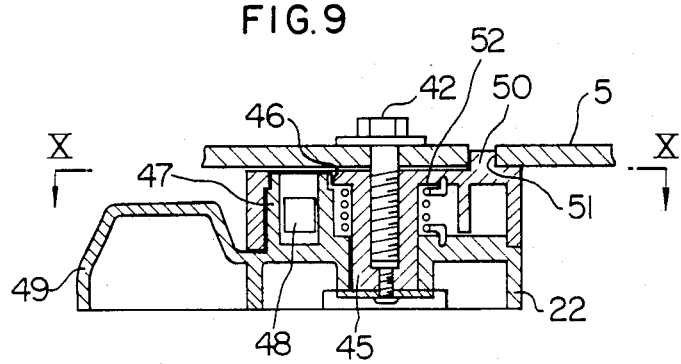
FIG. 9 is a sectional view of an essential part of the container box mounting device around the position adjust lever.
Figure 10:
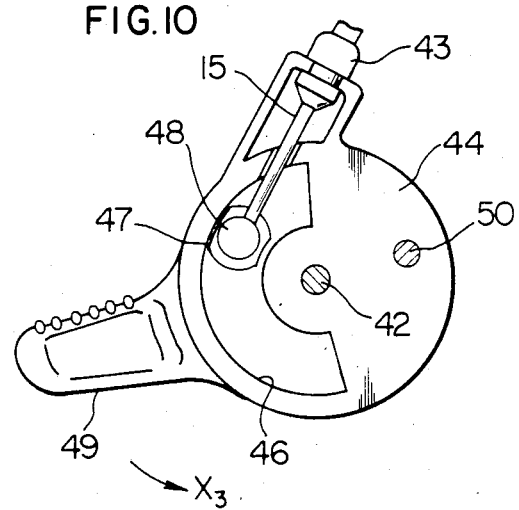
FIG. 10 is a view of the essential part of the position adjusting device as viewed in the direction of arrows X—X in FIG. 9.

The position adjust lever 22 shown in FIGS. 9 and 10 is fastened by a bolt 42 to a front portion of the container box 5, at such a position as to permit an easy manipulation of the fellow passenger even when he is seated on the motorcycle. The position adjust lever is rotatably secured to a shaft 45 on a body 44 which supports the outer tube end 43 (see FIG. 10) of the cable 15. A circumferential elongated hole 46 in the body 44 receives the projection 47 of the lever 22. The projection 47 is formed to hold an end piece 48 attached to the end of the cable 15.

The lever 22 is manipulated through a manipulating portion 49. The body 44 has a projection 50 which fits in a hole 51 in the container box 5 to prevent the body 44 from rotating. A coiled spring 52 acts between the lever 22 and the shaft 45 of the body 44 to reset the lever 22.

The adjustment of the position of the container box 5 mounted by means of the mounting device of the invention is made in a manner explained hereinunder.

When the position adjustment is made by means of the key 28 (see FIG. 6) during parking of the motorcycle, the key 28 is inserted into the key hole 24 (see FIG. 5) and rotated so that the rod 29 (see FIGS. 6 and 7) is rotated to push the connecting member 30 upward so that the lock bars 25 and 26 are simultaneously withdrawn from the slot 11 and the hole 12. In this state, the container box 5 is freely slidable along the rail portions 8 and 9 of the stay 4 so that the user can move the container box to any desired position on the stay 4 or even to demount the same by fully moving it rearwardly and withdrawing from the stay 4. As the key 28 is released from the manual force, the lock bars 25 and 26 are automatically lowered by the resilient force of the springs 38 and 39, so that the container box 5 is fixed at desired position because the second lock bar 26 is biased downwardly into the selected one of the holes 12.

When the fellow passenger on the motorcycle wishes to adjust the position of the container box 5, he manually swings the manipulating portion 49 (see FIGS. 9 and 10) in the direction of the arrow $X_3$ so that the cable 15 is pulled in the direction of the arrow $X_1$ as viewed in FIG. 7 to withdraw the second lock bar 26 solely from the hole 12 by the action of the claw 36 on the holder 33. In this case, the first lock bar 25 is kept in engagement with the slot 11 regardless of the operation of the lever 22, so that the container 5 is allowed to slide back and forth only within the range limited by the length of the slot 11. Then, as the manipulating portion 49 is released from the manual force, the cable 15 is moved by the action of the coiled spring 52 in the direction opposite to the direction of the arrow $X_1$ so that the second lock bar 26 is lowered by the force exerted by the spring 38. It will be understood that, when the position adjustment is made through the lever 22, the container box 5 is prevented from accidentally coming off from the stay 4 because the first lock lever 25 is kept in engagement with the elongated slot 11.

Thus, according to the invention, it is possible to adjust the position of the container box 5 in the back and forth direction, by bringing the second lock bar 26 into and out of engagement with the holes 12 by means of the lever 22 through the cable 15. The adjustment, of course, can be made by the user standing by the motorcycle when the latter is parked and even by the fellow passenger on the rear seat of the motorcycle and safely without using any special tool.

As has been described, according to the invention, the container box 5 on the rear side of the fellow passenger is mounted on the stay 4 for sliding motion in the back and forth directions and is mounted by means of a mounting device provided with a lock 21 and a plurality of lock bar holes 12 and a slot, the lock 21 being operable either by the key 28 or through manipulation of the lever 22. It is, therefore, possible to adjust the mounting position of the container box 5 in the back and forth direction without using any special tool. It is remarkable that the adjustment of the mounting position of the container box relieves him from the fatigue which has been heretofore inevitable in the long-distance touring. When the rider or riders leaves the motorcycle, they carry the container box with them because it can easily be demounted by using the key 28, so that there is no fear of the container box 5 being stolen.

In another embodiment of the invention, the slot 11 and the holes 12 are formed in the container box 5 while the lock 21 is provided on the stay 4 for operation by the lever 22 which is mounted on the stay 4 or other parts of the motorcycle body 1. In this case, it is possible to extend the cable 15 to permit the mounting of the lever 22 at such a position as to allow the rider on the front seat to manipulate the lever 22 easily and safely, e.g. on the handle bar. Thus, the container box mounting device of the invention is applicable also to the motorcycles which are not intended for tandem riding. Obviously, the cable 15 for remotely controlling the second lock bar 26 can be substituted by electric means such as a solenoid, and the advantages of the invention will not be suppressed by such a substitution.

While preferred embodiments of the invention have been described using specific terms, such description is for illustrative purpose only, and it is to be understood that changes and variations may be made without departing from the spirit or scope of the following claim.

What is claimed is:

1. In a motorcycle having a container box mounted on the motorcycle above the rear wheel, a device for mounting said container box comprising:
   supports mounted on said motorcycle;
   means on said container box in sliding engagement with said supports and cooperating therewith to hold said box on said supports and to permit said box to slide in a back and forth direction along said supports; and
   locking means for releasably fixing said container box selectively at one of at least two predetermined positions including a locking member fixed to said supports, said locking member having an elongated slot parallel to said direction of back and forth movement and a row of holes arranged parallel to said slot, a pair of locking bars engageable in said locking member, one of said bars being engageable in said slot and the other of said bars being engageable in said holes, key means connected to disengage and unlock both of said bars simultaneously from said locking member to permit said box to slide back and forth along and to be removed endwise from said supports.

2. In a motorcycle having a container box mounted on the motorcycle above the rear wheel, a device for mounting said container box comprising:
   supports mounted on said motorcycle:
   means on said container box in sliding engagement with said supports and cooperating therewith to hold said box on said supports and to permit said box to slide in a back and forth direction along said supports; and
   locking means for releasably fixing said container box selectively at one of at least two predetermined positions including a locking member fixed to said supports, a pair of locking bars engageable in said locking member, position adjustment means connected to disengage and unlock one of said bars from said locking member to permit said box to be moved back and forth and adjusted along said supports and to re-engage and lock said one bar in said locking member at a desired position, the other said bar and said locking member cooperating to permit limited back and forth movement for adjustment.

3. A device for mounting said container box according to claim 2, said locking member having an elongated slot parallel to said direction of back and forth movement, and a row of holes arranged parallel to said slot, said other of said bars engageable in said slot and said one of said bars engageable in said holes.

4. In a motorcycle having a container box mounted on the motorcycle above the rear wheel, a device for mounting said container box comprising:
   supports mounted on said motorcycle;
   means on said container box in sliding engagement with said supports and cooperating therewith to hold said box on said supports and to permit said box to slide in a back and forth direction along said supports; and
   locking means for releasably fixing said container box selectively at one of at least two predetermined positions including a locking member fixed to said supports, a pair of locking bars engageable in said locking member, key means connected to disengage and unlock both of said bars simultaneously from said locking member to permit said box to slide back and forth along and to be removed endwise from said supports, and separately operable position adjustment means connected to disengage and unlock one of said bars from said locking member to permit said box to be moved back and forth and adjusted along said supports and to re-engage and lock said one bar in said locking member at a desired position, the other said bar and said locking member cooperating to permit limited back and forth movement for adjustment.

5. A device for mounting said container box according to claim 4, said locking member having an elongated slot parallel to said direction of back and forth movement, and a row of holes arranged parallel to said slot, said other of said bars being engageable in said slot and said one of said bars being engageable in said holes.

* * * * *